(12) United States Patent
Ono

(10) Patent No.: US 7,747,367 B2
(45) Date of Patent: Jun. 29, 2010

(54) VEHICLE PHYSICAL QUANTITY ESTIMATION APPARATUS AND STORAGE MEDIUM HAVING STORED THEREON COMPUTER PROGRAM RELATING TO THE APPARATUS

(75) Inventor: Eiichi Ono, Toyota (JP)

(73) Assignee: Kabushiki Kaisha Toyota Chuo Kenkyusho, Aichi (JP)

( * ) Notice: Subject to any disclaimer, the term of this patent is extended or adjusted under 35 U.S.C. 154(b) by 835 days.

(21) Appl. No.: 11/633,012

(22) Filed: Dec. 4, 2006

(65) Prior Publication Data
US 2007/0156316 A1 Jul. 5, 2007

(30) Foreign Application Priority Data

Dec. 6, 2005 (JP) .............................. 2005-352246
Aug. 11, 2006 (JP) .............................. 2006-220661

(51) Int. Cl.
B60G 17/16 (2006.01)

(52) U.S. Cl. ........................... 701/38; 701/37; 104/284; 280/5.5

(58) Field of Classification Search ............. 701/37–38; 104/284; 280/5.5; 180/337
See application file for complete search history.

(56) References Cited

U.S. PATENT DOCUMENTS

| | | | | | |
|---|---|---|---|---|---|
| 4,767,363 | A | * | 8/1988 | Uchida et al. | 440/1 |
| 4,940,433 | A | * | 7/1990 | Raber | 440/1 |
| 5,118,315 | A | * | 6/1992 | Funami et al. | 440/1 |
| 5,142,473 | A | * | 8/1992 | Davis | 701/21 |
| 5,203,727 | A | * | 4/1993 | Fukui | 440/1 |
| 5,248,114 | A | * | 9/1993 | Ankeney | 244/3.15 |
| 5,809,436 | A | * | 9/1998 | Gregory | 701/21 |
| 6,364,726 | B1 | * | 4/2002 | Motose et al. | 440/86 |

(Continued)

FOREIGN PATENT DOCUMENTS

JP A 08-332934 12/1996

(Continued)

OTHER PUBLICATIONS

Helmut Hoelzer's Fully Electronic Analog Computer; Tomayko, James E.; Annals of the History of Computing, IEEE vol. 7, Issue 3, Jul.-Sep. 1985 pp. 227-240; Digital Object Identifier 10.1109/MAHC.1985.10025.*

(Continued)

Primary Examiner—Cuong H Nguyen
(74) Attorney, Agent, or Firm—Oliff & Berridge, PLC

(57) ABSTRACT

A vehicle physical quantity estimating device including: a longitudinal vehicle body velocity estimating unit, estimating a longitudinal vehicle body velocity based on vehicle wheel velocities of each wheel; a longitudinal/lateral acceleration state value deviation computing unit, computing deviations in longitudinal and lateral acceleration state values based on output sensor signals corresponding to detected values of the vehicle motions of triaxial accelerations and triaxial angular velocities output from a sensor, and the estimated longitudinal vehicle body velocity; a low pass filter, letting only signals corresponding to motions that need attention pass through from the longitudinal/lateral acceleration state value deviation computing unit 14; and an attitude angle estimating unit, estimating the attitude angle based on the sensor signal(s), and signal(s) representing the deviations in longitudinal and lateral acceleration state values after low pass filter processing. Also, a memory medium, storing a computer program for the device.

25 Claims, 6 Drawing Sheets

U.S. PATENT DOCUMENTS

| | | | | |
|---|---|---|---|---|
| 6,520,815 | B2* | 2/2003 | Bernier et al. | 440/40 |
| 6,663,447 | B1* | 12/2003 | Bernier et al. | 440/40 |
| 6,855,020 | B2* | 2/2005 | Kaji | 440/84 |
| 6,973,847 | B2* | 12/2005 | Adams et al. | 74/5.47 |
| 6,997,763 | B2* | 2/2006 | Kaji | 440/1 |
| 7,037,147 | B2* | 5/2006 | Kinoshita et al. | 440/1 |
| 7,364,480 | B2* | 4/2008 | Ito et al. | 440/1 |
| 7,430,466 | B2* | 9/2008 | Kaneko et al. | 701/41 |
| 7,549,900 | B2* | 6/2009 | Kinoshita et al. | 440/1 |
| 7,647,143 | B2* | 1/2010 | Ito et al. | 701/21 |
| 2006/0095181 | A1* | 5/2006 | Darvish | 701/38 |

FOREIGN PATENT DOCUMENTS

| | | | |
|---|---|---|---|
| JP | A 2002-243494 | | 8/2002 |
| JP | 2005-352246 | * | 12/2005 |
| JP | 2006-220661 | * | 8/2006 |
| JP | 2006-273622 | * | 10/2006 |
| WO | PCT/JP2007/069404 | * | 10/2008 |

OTHER PUBLICATIONS

A Small Low-Cost Hybrid Orientation System and Its Error Analysi; Rong Zhu; Zhaoying Zhou; Sensors Journal, IEEE; vol. 9, Issue 3, Mar. 2009 pp. 223-230; Digital Object Identifier 10.1109/JSEN.2008.2012196.*

Magnetometer and differential carrier phase GPS-aided INS for advanced vehicle control; Yunchun Yang; Farrell, J.A.; Robotics and Automation, IEEE Transactions on; vol. 19, Issue 2, Apr. 2003 pp. 269-282; Digital Object Identifier 10.1109/TRA.2003.809591.*

Multi-sensor Information Fusion for Aircraft Attitude Determination System; Zhen Ziyang; Wang Zhisheng; Hu Yong; Computer Science and Information Engineering, 2009 WRI World Congress on; vol. 6, Mar. 31-Apr. 2, 2009 pp. 474-478 Digital Object Identifier 10.1109/CSIE.2009.108.*

Position and velocity optimal sensor-based navigation filters for UAVs; Batista, P.; Silvestre, C.; Oliveira, P.; American Control Conference, 2009. ACC '09.; Jun. 10-12, 2009 pp. 5404-5409; Digital Object Identifier 10.1109/ACC.2009.5159877.*

Optimal position and velocity navigation filters with discrete-time delayed measurements; Batista, P.; Silvestre, C.; Oliveira, P.; Decision and Control, 2008. CDC 2008. 47th IEEE Conference on; Dec. 9-11, 2008 pp. 1320-1325; Digital Object Identifier 10.1109/CDC.2008.4738628.*

A complementary filter for attitude estimation of a fixed-wing UAV; Euston, M.; Coote, P.; Mahony, R.; Jonghyuk Kim; Hamel, T.; Intelligent Robots and Systems, 2008. IROS 2008. IEEE/RSJ International Conference on; Sep. 22-26, 2008 pp. 340-345 Digital Object Identifier 10.1109/IROS.2008.4650766.*

Accelerometers and an aircraft attitude evaluation; Rohac, J.; Sensors, 2005 IEEE; Oct. 30-Nov. 3, 2005 p. 6 pp. Digital Object Identifier 10.1109/ICSENS.2005.1597817.*

Multi-sensor personal navigator supported by adaptive knowledge based system: Performance assessment; Moafipoor, S.; Grejner-Brzezinska, D.A.; Toth, C.K.; Position, Location and Navigation Symposium, 2008 IEEE/ION; May 5-8, 2008, pp. 129-140; Digital Object Identifier 10.1109/PLANS.2008.4570049.*

Inertial navigation for wheeled robots in outdoor terrain; Koch, J.; Hillenbrand, C.; Berns, K.; Robot Motion and Control, 2005. RoMoCo '05. Proceedings of the Fifth International Workshop on; Jun. 23-25, 2005 pp. 169-174.*

Foot and ground measurement using portable sensors; Svensson, W.; Holmberg, U.; Rehabilitation Robotics, 2005. ICORR 2005. 9th International Conference on; Jun. 28-Jul. 1, 2005 pp. 448-451; Digital Object Identifier 10.1109/ICORR.2005.1501139.*

N. Lovren and J. K. Pieper, "Error analysis of direction cosines and quaternion parameters techniques for aircraft attitude determination," IEEE Trans. Aerosp. Electron. Syst., vol. 34, No. 3, pp. 983-989, 1998.*

R. Zhu and Z. Y. Zhou, "Optical alignment applied for solving axis-misaligned errors in micro electro-mechanical systems," Int. J. Nonlinear Sciences and Numerical Simulation, vol. 3, No. 3-4, pp. 345-348, 2002.*

R. Zhu and Z. Y. Zhou, "A novel miniature azimuth-level detector based on MEMS," in Proc. Microelectromech. Syst. Conf., Berkeley, CA, Aug. 2001, pp. 50-53.*

Kato, et al; (1982); "Introduction to Aircraft Dynamics"; Tokyo University Publishers; p. 12. (with translation).

* cited by examiner

F I G. 3
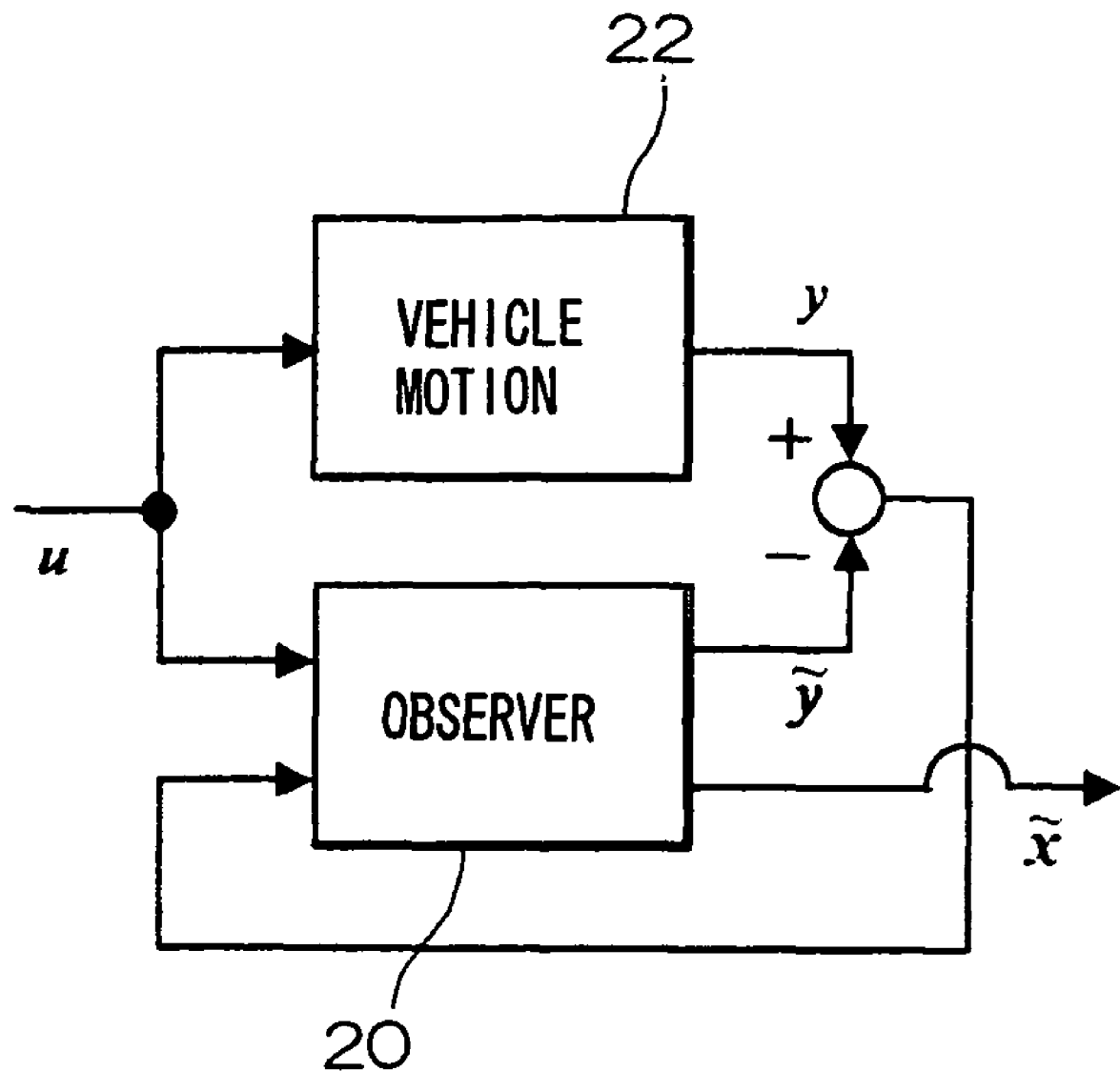

VEHICLE PHYSICAL QUANTITY ESTIMATION APPARATUS AND STORAGE MEDIUM HAVING STORED THEREON COMPUTER PROGRAM RELATING TO THE APPARATUS

BACKGROUND OF THE INVENTION

1. Technical Field

The present invention relates to a vehicle physical quantity estimating device, and to a memory medium storing a computer program for operating such a device. In particular, the present invention relates to a device for estimating, as vehicle physical quantities, such as, an attitude angle of a vehicle relative to a vertical axis, and/or a vehicle velocity in the forward-reverse (longitudinal) direction and a vehicle velocity in the lateral direction, and to a memory medium storing a computer program for operating such a device.

2. Related Art

The relationship between the acceleration and angular velocity of a rigid moving body and the attitude angle of a vehicle expressed in Euler angles is known from "Introduction to Aircraft Dynamics" (page 12, by Kato, Oya, and Karasawa; published by Tokyo University Publishers, 1982) and the like, and by integration computation based on this relationship, the attitude angle of a vehicle may be derived. However, in simple integration computation, sensor drift errors accumulate, and an accurate attitude angle cannot be derived. In order to overcome such an accumulated error in integration computation, it is necessary to configure an observer that compares the result to the output from another sensor signal and carries out correction so that they approximately match.

As conventional technology using such a correction method for estimating an attitude angle from a vehicle acceleration signal, and angular velocity signal, is the known technology of: using a signal showing vehicle velocity as the another sensor signal, and estimating the sensor inclination angle, that is to say the pitch angle, from the relationship between vehicle velocity, and the longitudinal acceleration and gravitational acceleration (see Japanese Patent Application Laid-Open (JP-A) No. 2002-243494). In this technology, pitch angle is estimated under the presumption that deviations between the value of the integral of vehicle velocity and the value of the longitudinal acceleration arise according to the pitch angle.

Further, as conventional technology for estimating vehicle body slip angle corresponding to vehicle body lateral velocity is the known method of: deriving a difference by subtracting the lateral velocity from the product of the vehicle velocity and the yaw angular velocity, further taking as an estimate value of the cant the sum of this difference and the rate of change in the estimated lateral velocity computed from a vehicle motion model, and by correcting this cant, with the low frequency components of the estimated value of cant taken as the cant components of the road surface, to give a slip angle estimating method that is not influenced by the cant of the road surface (see Japanese Patent Application Laid-Open (JP-A) No. 8-332934).

However, since the vehicle velocity is an estimate computed from the wheel velocities of each of the wheels detected by wheel velocity sensors provided for each of the vehicle wheels, if during acceleration or deceleration a condition of tire slippage develops then an error in the estimation is generated. Therefore if, based on the technology of the above "Introduction to Aircraft Dynamics" (page 12, by Kato, Oya, and Karasawa; published by Tokyo University Publishers, 1982), estimation computation of the pitch angle is carried out simply from the deviation between the value of the integration of the vehicle velocity and the value of the longitudinal acceleration, then there is a problem that errors in the estimated pitch angle increase when there is tire slip during acceleration or deceleration.

Also, the estimated value of cant is a value that increases with an increase in the vehicle body slip angle when spin is generated. Therefore, in conventional technology of the second Patent Publication above, there is a problem that where spin is generated on a low μ road surface at a slow velocity of occurrence, then since this also influences the low frequency components these are interpreted as components of the road surface cant, with the result that the computation of the vehicle body slip angle is corrected, and spin cannot be estimated.

Also, when there is a road surface cant with frequencies the same as or higher than the preset frequency, then since correction for cant is delayed which leads to an increase in the estimated value of the vehicle body slip, there is the problem that this may be misinterpreted as spin.

SUMMARY OF THE INVENTION

The present invention is made to solve the above problems, therefore, the influence of spin and tire slip on the vehicle motion is confined to a relatively high frequency region, that is to say, recognizing that they are not phenomena that continue for a long period of time, an object of the invention is to provide a vehicle physical quantity estimating device that estimates the attitude angle based on an observer from components in the longitudinal direction and components in the lateral direction of the vehicle motion that are in the relatively low frequency region that is not influenced by spin and tire slip, and their relationship with the vehicle attitude angle, and also to provide a memory medium storing a computer program related to such a device.

Further, an object it to provide a vehicle physical quantity estimating device that, by using the estimated attitude angle, and by computation eliminating the influence of gravitational acceleration on the sensor values of accelerations on each of the axes, may make a high precision new estimate of the vehicle body velocity in the longitudinal direction, and also to provide a memory medium storing a computer program related to such a device.

To achieve the above objects the present invention is a vehicle physical quantity estimating device configured including: a longitudinal vehicle body velocity estimating unit, estimating, based on vehicle wheel velocities of each of the wheels, a longitudinal vehicle body velocity that is the vehicle body velocity in the forward-reverse direction of a vehicle; a longitudinal/lateral acceleration state value deviation computing unit, computing a deviation in a longitudinal acceleration state value and a deviation in a lateral acceleration state value that develop according to a vehicle attitude angle, based on sensor signal(s) corresponding to detected values of the vehicle motions of triaxial accelerations of a longitudinal acceleration, a lateral acceleration and a vertical acceleration and triaxial angular velocities of a roll angle velocity, a pitch angle velocity, and a yaw angular velocity, and based on the estimate of the longitudinal vehicle body velocity; a low pass filter, carrying out processing that lets only signals corresponding to motions that need attention pass through from signals that express the deviation in a longitudinal acceleration state value and the deviation in a lateral acceleration state value; and an attitude angle estimating unit, estimating as a vehicle physical quantity the attitude angle as a based on the sensor signal(s), a signal representing the deviation in a longitudinal acceleration state value after low pass filter processing, and a signal representing the deviation in a lateral acceleration state value after low pass filter processing.

The memory medium on which a computer program is stored of the present invention is one in which the computer program causes a computer to perform functions including those of: a longitudinal vehicle body velocity estimating unit, estimating, based on vehicle wheel velocities of each of the wheels, a longitudinal vehicle body velocity that is the vehicle body velocity in the forward-reverse direction of a vehicle; a longitudinal/lateral acceleration state value deviation computing unit, computing a deviation in a longitudinal acceleration state value and a deviation in a lateral acceleration state value that develop according to the vehicle attitude angle, based on sensor signal(s) corresponding to detected values of the vehicle motions of triaxial accelerations of a longitudinal acceleration, a lateral acceleration and a vertical acceleration and triaxial angular velocities of a roll angle velocity, a pitch angle velocity, and a yaw angular velocity, and based on the estimate of the longitudinal vehicle body velocity; a low pass filter, carrying out processing that lets only signals corresponding to motions that need attention pass through from signals that express the deviation in a longitudinal acceleration state value and the deviation in a lateral acceleration state value; and an attitude angle estimating unit, estimating as a vehicle physical quantity the attitude angle based on the sensor signal(s), a signal representing the deviation in a longitudinal acceleration state value after low pass filter processing, and a signal representing the deviation in a lateral acceleration state value after low pass filter processing.

The present invention: computes a deviation in a longitudinal acceleration state value and a deviation in a lateral acceleration state value that develop according to the vehicle attitude angle, based on sensor signal(s) corresponding to values detected by a triaxial sensor of triaxial accelerations and triaxial angular velocities, and based on the estimate of the longitudinal vehicle body velocity; carries out processing, by a low pass filter, that lets only signals corresponding to motions that need attention pass through from signals that express the deviation in a longitudinal acceleration state value and the deviation in a lateral acceleration state value; and estimates the attitude angle based on the sensor signal(s), a signal representing the deviation in a longitudinal acceleration state value after low pass filter processing, and a signal representing the deviation in a lateral acceleration state value after low pass filter processing.

The vehicle attitude angle may be at least one of the roll angle and/or the pitch angle relative to a vertical axis of a vehicle.

A region of the signals corresponding to the vehicle motions that need attention passed through by the low pass filter may be set to a low frequency region that is not influenced by vehicle motions, with time constants from a few seconds to several tens of seconds. In this low frequency region the vehicle body velocity in the longitudinal direction matches the estimated value of the longitudinal vehicle body velocity computed from the vehicle wheel speeds, and since, as an inherent vehicle characteristic, the value of the derivative of the vehicle body lateral velocity is 0, this characteristic may be used as a constraint condition to limit divergence in integration computation. Therefore, in the frequency region in which spin and tire slip vehicle motions occur, estimation computation may be by integration computation of the acceleration and angular velocities for the attitude angle, and an observer is configured working to the vehicle inherent constraint conditions in order to suppress integration error that accompanies sensor drift, and estimation of a high precision attitude angle may be undertaken in all frequency bands.

Further, the vehicle physical quantity estimating device of the present invention may be configured including: a longitudinal vehicle body velocity estimating unit, estimating, based on vehicle wheel velocities of each of the wheels, a longitudinal vehicle body velocity that is the vehicle body velocity in the forward-reverse direction of a vehicle; a lateral acceleration deviation computing unit, computing a deviation in a lateral acceleration state value that develops according to a vehicle attitude angle, based on sensor signal(s) corresponding to detected value(s) of vehicle motion behavior, and the estimate of the longitudinal vehicle body velocity; a low pass filter, carrying out processing that lets only signals corresponding to motions that need attention pass through from signals that express the deviation in a lateral acceleration state value; and an attitude angle estimating unit, estimating the attitude angle as a vehicle physical quantity based on the sensor signal(s), and a signal representing the deviation in a lateral acceleration state value after low pass filter processing. The vehicle physical quantity estimating device of the present invention may also be configured including: a longitudinal vehicle body velocity estimating unit, estimating, based on vehicle wheel velocities of each of the wheels, a longitudinal vehicle body velocity that is the vehicle body velocity in the forward-reverse direction of a vehicle; a longitudinal/lateral acceleration deviation computing unit, computing a deviation in a longitudinal acceleration state value and a deviation in a lateral acceleration state value that develop according to a vehicle attitude angle, based on sensor signal(s) corresponding to detected values of vehicle motion behavior and the estimate of the longitudinal vehicle body velocity; a low pass filter, carrying out processing that lets only signals corresponding to motions that need attention pass through from signals that express the deviation in a longitudinal acceleration state value and the deviation in a lateral acceleration state value; and an attitude angle estimating unit, estimating as a vehicle physical quantity the attitude angle based on the sensor signal(s), a signal representing the deviation in a longitudinal acceleration state value after low pass filter processing, and a signal representing the deviation in a lateral acceleration state value after low pass filter processing.

Further, the memory medium storing a computer program of the present invention may be configured with a computer program causing a computer to perform functions including those of: a longitudinal vehicle body velocity estimating unit, estimating, based on vehicle wheel velocities of each of the wheels, a longitudinal vehicle body velocity that is the vehicle body velocity in the forward-reverse direction of a vehicle; a lateral acceleration deviation computing unit, computing a deviation in a lateral acceleration state value that develops according to a vehicle attitude angle, based on sensor signal(s) corresponding to detected value(s) of vehicle motion behavior, and the estimate of the longitudinal vehicle body velocity; a low pass filter, carrying out processing that lets only signals corresponding to motions that need attention pass through from signals that express the deviation in a lateral acceleration state value; and an attitude angle estimating unit, estimating as a vehicle physical quantity the attitude angle based on the sensor signal(s), and a signal representing the deviation in a lateral acceleration state value after low pass filter processing. The memory medium storing a computer program of the present invention may also have the computer program causing a computer to perform functions including those of: a longitudinal vehicle body velocity estimating unit, estimating, based on vehicle wheel velocities of each of the wheels, a longitudinal vehicle body velocity that is the vehicle body velocity in the forward-reverse direction of a vehicle; a longitudinal/lateral acceleration deviation computing unit, computing a deviation in a longitudinal acceleration state value and a deviation in a lateral acceleration state value that develop according to a vehicle attitude angle, based on sensor signal(s) corresponding to detected values of vehicle motion behavior and the estimate of the longitudinal vehicle body velocity; a low pass filter, carrying out processing that lets only signals corresponding to motions that need attention pass through from signals that express the deviation in a longitudinal acceleration state value and the deviation in a lateral acceleration state value; and an attitude angle estimating unit, estimating as a vehicle physical quantity the attitude angle based on the sensor signal(s), a signal representing the deviation in a longitudinal acceleration state value after low pass filter processing, and a signal representing the deviation in a lateral acceleration state value after low pass filter processing.

In the present invention: for the detected values of vehicle motion behavior, the respective detected values of lateral acceleration and yaw angular velocity may be used; for the deviation in a lateral acceleration state value, a value that is the product of the detected value of the yaw angular velocity with the estimated value of the longitudinal vehicle body velocity, from which the detected value of the lateral acceleration is subtracted, may be used; and roll angle may be used as the attitude angle estimated by the attitude angle estimating unit. Also: for the detected values of vehicle motion behavior, the respective detected values of longitudinal acceleration, lateral acceleration, vertical acceleration, roll angular velocity, and yaw angular velocity may be used; for the deviation in a longitudinal acceleration state value, a value that is the derivative of the estimated value of the longitudinal vehicle body velocity from which the longitudinal acceleration has been subtracted may be used; and for the deviation in a lateral acceleration state value, a value that is the product of the yaw angular velocity value with the estimated value of the longitudinal vehicle body velocity, from which the lateral acceleration is subtracted, may be used.

By the above, when assuming normal vehicle motion, the pitch angle is relatively small compared with the roll angle, and if the pitch angle is presumed to be 0 then the roll angle may be estimated.

Also, as explained above, attitude angle (that is at least one of pitch angle and/or roll angle) may be estimated based on triaxial angular velocities and triaxial accelerations, and the estimated value of the longitudinal vehicle body velocity, by: using for the detected values of vehicle motion behavior, the respective detected values of triaxial accelerations and triaxial angular velocities of longitudinal acceleration, lateral acceleration, vertical acceleration, roll angular velocity, pitch angular velocity, and yaw angular velocity; by using for the deviation in a longitudinal acceleration state value, a value that is the derivative of the estimated value of the longitudinal velocity from which the longitudinal acceleration has been subtracted; and by using for the deviation in a lateral acceleration state value, a value that is the product of the yaw angular velocity value with the estimated value of the longitudinal vehicle body velocity, from which the lateral acceleration is subtracted.

The present invention may be further provided with a vehicle body velocity estimating unit, estimating vehicle physical quantities of a new vehicle body velocity in the vehicle longitudinal direction and a vehicle velocity in the lateral direction, based on: the estimated value of attitude angle, estimated by the attitude angle estimating unit; the vehicle motions of triaxial acceleration and triaxial angular velocity detected by the sensor; the estimated value of the vehicle body velocity in the vehicle longitudinal direction, estimated by the longitudinal velocity estimating unit; and a steering angle. The present invention may also be further provided with a vehicle body velocity estimating unit, estimating vehicle physical quantities of a new vehicle body velocity in the vehicle longitudinal direction and a vehicle velocity in the lateral direction, based on: the estimated value of attitude angle, estimated by the attitude angle estimating unit; the detected values of the vehicle motion behavior; the estimated value of the longitudinal vehicle body velocity, estimated by the longitudinal velocity estimating unit; and a steering angle.

By the above, it is possible to estimate with high precision the new vehicle velocity in the vehicle longitudinal direction and the vehicle velocity in the lateral direction, and estimations of vehicle body slip angle and slip velocity of each of the wheels, estimations necessary for suppressing spin and suppressing tire slip, may be carried out with high precision.

In the present invention: for the deviation in the longitudinal acceleration state value, a value that is the value of the derivative of the estimated value of the longitudinal velocity, from which the longitudinal acceleration value detected by the sensor is subtracted, may be used; for the deviation of the lateral velocity state value, a value that is the product of the yaw angular velocity detected by the sensor with the estimated value of the longitudinal velocity, from which the lateral acceleration value detected by the sensor is subtracted, may be used.

BRIEF DESCRIPTION OF THE DRAWINGS

FIG. 3 is a block diagram showing an observer, which is present in each of the embodiments of the present invention.

DETAILED DESCRIPTION OF THE INVENTION

A detailed explanation will now be given of embodiments of the present invention with reference to the drawings. Explanation will be given of a first embodiment, while referring to FIG. 1, in which the present invention is applied to an angle of attitude estimating device for estimating a pitch angle and roll angle of a vehicle, that are angles of attitude relative to a vertical axis.

Figure 1:
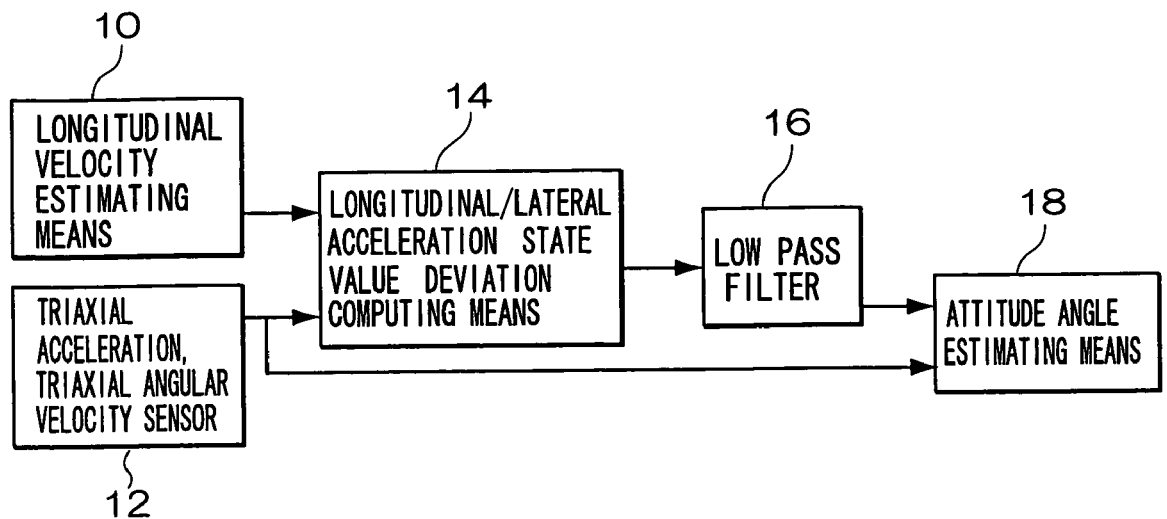
FIG. 1 is a block diagram showing a first embodiment of the present invention.

As shown in FIG. 1, provided in the angle of attitude estimating device of the present embodiment is a longitudinal velocity estimating unit 10 for estimating the speed of the vehicle body in the forward and reverse directions based on the velocity of each of the wheels. The wheel velocity of each of the wheels may be measured by wheel velocity sensors provided for each of the wheels, and the vehicle velocity may be estimated from the wheel velocity of each of the wheels, or from the wheel velocity of each of the wheels and differential values of the wheel velocities. Example methods are: under braking, the maximum value of the wheel velocities for the 4 wheels may be output as the vehicle velocity; and, when driving, the average wheel velocity of the driven wheels may be output as the vehicle velocity.

Figure 2:
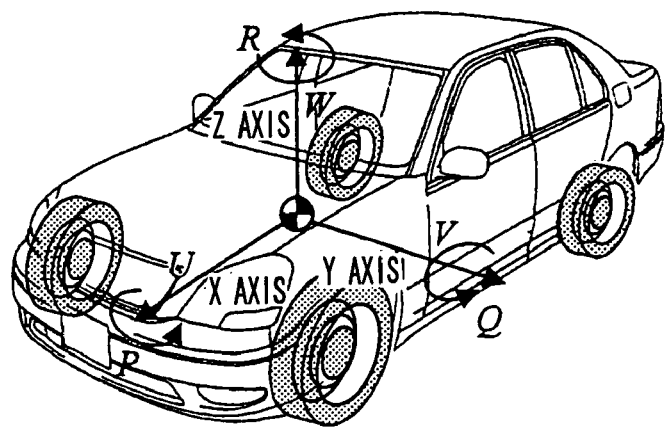
FIG. 2 is an explanatory diagram showing a coordinate system of the present embodiment.

Also, provided in the angle of attitude estimating device of the present embodiment is a triaxial sensor 12, fixed to the vehicle, detecting the vehicle motion behavior that is triaxial xyz accelerations and triaxial angular velocities, and outputting a sensor signal corresponding to the detected values. As shown in FIG. 2, the x-axis corresponds to the vehicle forward-reverse (longitudinal) direction, the y-axis corresponds to the vehicle width (lateral) direction, and the z-axis corresponds to the vehicle up-down direction.

The longitudinal velocity estimating unit 10 and the triaxial sensor 12 are connected to a longitudinal/lateral acceleration state value deviation computing unit 14, which, based on the estimated value of the longitudinal vehicle velocity estimated by the longitudinal velocity estimating unit 10, and based on the sensor signal output from the triaxial sensor 10, computes the deviation of the longitudinal acceleration state value and the deviation in the lateral acceleration state value that are generated according to the angle of vehicle attitude relative to a vertical axis.

The longitudinal/lateral acceleration state value deviation computing unit 14 is connected to a low pass filter 16 that is for allowing only the signals to pass through that correspond to motions which should have attention focused on, from the signals representing the longitudinal acceleration state value deviation or from the signals representing the lateral acceleration state value deviation. That is to say, signals corresponding to motions in a low frequency region that are not affected by the vehicle motion, such as spin or tire slips and the like, with a time constant from several seconds to several tens of seconds or more. The low pass filter 16 is connected to an attitude angle estimating unit 18 that estimates the attitude angle of the vehicle relative to a vertical axis from the triaxial sensor signal, the signal representing the deviation of the longitudinal acceleration state value after low pass filter processing, and the signal representing the deviation of the lateral acceleration state value after low pass filter processing.

The longitudinal velocity estimating unit 10, the longitudinal/lateral acceleration state value deviation computing unit 14, the low pass filter 16 and the attitude angle estimating unit 18 may be configured by a single or multiple computers, or by a single of multiple electrical circuits, that realize the functionality of the respective units.

Next, the observer of the present embodiment will be explained. Motion equations of a rigid body may be expressed as below, showing the relationship between the sensor signal, output from the triaxial sensor that is fixed to the rigid body and detects the triaxial acceleration and triaxial angular velocity, and values of the motion state.

$$\dot{U}+QW-RV=g\sin\theta+G_x \quad (1)$$

$$\dot{V}+RU-PW=-g\cos\theta\sin\phi+G_y \quad (2)$$

$$\dot{W}+PV-QU=-g\cos\theta\cos\phi+G_z \quad (3)$$

$$\dot{\phi}=P+Q\sin\phi\tan\theta+R\cos\phi\tan\theta \quad (4)$$

$$\dot{\theta}=Q\cos\phi-R\sin\phi \quad (5)$$

Here, Gx is the longitudinal acceleration, Gy is the lateral acceleration, Gz is the vertical acceleration, P is the roll angular velocity, Q is the pitch angular velocity, R is the yaw angular velocity, U is the longitudinal velocity, V is the lateral velocity, W is the vertical velocity, $\phi$ is the roll angle, $\theta$ is the pitch angle, and g is the gravitational acceleration.

In the present embodiment if the vehicle is considered to be a rigid body, the triaxial acceleration of longitudinal acceleration Gx, lateral acceleration Gy and the vertical acceleration Gz, the triaxial angular velocity of roll angular velocity P, pitch angular velocity Q and yaw angular velocity R, are detected respectively by the triaxial sensor 12, and longitudinal velocity U may be estimated by the longitudinal velocity estimating unit 10 based on the wheel velocities of each of the wheels.

Here, in the present embodiment, as shown in FIG. 2, coordinates are expressed with the positive direction of the z-axis in the upward facing direction of the car body, using a right-handed system, and angles are expressed as Euler angles.

Next, explanation will be given of vehicle inherent motion constraint conditions in a case when an observer is used. In a configuration of an observer 20 as shown in FIG. 3, using with the above motion equations, measurable feedback in the physical quantities is required, so that the state values of the velocity and angular velocity estimated by integration processing do not diverge. The block 22 representing the vehicle motion, as in FIG. 3, corresponds to portions of the longitudinal velocity estimating unit 10, the longitudinal/lateral acceleration state value estimating unit 14, the low pass filter 16 and the attitude angle estimating unit 18 of FIG. 1.

In the present embodiment, inherent characteristics of the vehicle motion are used as physical quantities for feedback, such as "longitudinal direction velocity estimatable from the wheel velocity" and the like. The algorithm for estimating the vehicle velocity in the vehicle longitudinal direction from the wheel velocity is already established in ABS, and generally this signal is represented as $V_{s0}$. By using this signal, the longitudinal velocity U that is the vehicle velocity in the vehicle longitudinal direction may be represented by the following substitution equation.

$$U=V_{s0} \quad (6)$$

By differentiating the above equation (6) and substituting in equation (1), the following equation (7) may be obtained.

$$\dot{V}_{s0}+QW-RV=g\sin\theta+G_x \quad (7)$$

$\dot{V}_{s0}$ here is a value that derived from the values measured by the wheel velocity sensor, and, if Gx is taken as the value measured by the triaxial sensor, then the limitations of the motion states may be captured. Also, if only considering motions for a reasonably long period of time, then the product of pitch angular velocity Q and vertical velocity W, and the product of yaw angular velocity R and lateral velocity V, are small and may be ignored, and so equation (7) may be approximated to the following equation (8).

$$\dot{V}_{s0}-G_x=g\sin\theta \quad (8)$$

Also, in the same way when considering motions over a sufficiently long period of time that unstable motions of a vehicle such as the spin or the like may be ignored, the lateral velocity, roll angular velocity, and lateral acceleration may be ignored, so the equation (2) may be approximated to the equation (9).

$$RV_{s0}-G_y=-g\cos\theta\sin\phi \quad (9)$$

Furthermore, when considering a general road gradient, the acceleration in the vertical axis direction may be considered to be substantially the same as the gravitational acceleration. These states may be expressed in the following algebraic equation formula using longitudinal acceleration Gx, lateral acceleration Gy, vertical acceleration Gz, pitch angle θ, and roll angle φ.

$$-G_x \sin\theta + G_y \sin\phi \cos\theta + G_z \cos\phi \cos\theta = g \quad (10)$$

Also, when considering motion over a suitably long period of time, the longitudinal, lateral, vertical velocity vectors when averaged may be considered to be approximately within a horizontal plane, so the following algebraic equation formula may be obtained using the longitudinal velocity U, lateral velocity V, vertical velocity W, pitch angle θ, and roll angle φ.

$$-U \sin\theta + V \sin\phi \cos\theta + W \cos\phi \cos\theta = 0 \quad (11)$$

This algebraic equation expresses a limitation condition of the inherent characteristics of the vehicle motion, showing that velocity in the vertical axis direction may be compared velocity in a horizontal plane, and ignored.

Next, as shown in FIG. 3, a configuration of a basic non-linear observer will be explained. Here, a sensor signal u, output from the triaxial sensor, is expressed as per equation (12) below.

$$u = [G_x G_y G_z PQR]^t \quad (12)$$

Further, if the vehicle motion in question is expressed as per the equation (13) below, and the physical quantities that may be measured for configuring an observer are expressed as per equation (14) below, then a non-linear observer may be described by non-linear motion equations of equation (15) and equation (16) below.

$$\dot{x} = f(x, u) \quad (13)$$

$$y = g(x, u) \quad (14)$$

$$\dot{\tilde{x}} = f(\tilde{x}, u) + k(\tilde{x}, u) \cdot (y - \tilde{y}) \quad (15)$$

$$\tilde{y} = g(\tilde{x}, u) \quad (16)$$

$\tilde{x}$ and $\tilde{y}$ in the above, represent estimated values of x, and y respectively, and $k(\tilde{x}, u)$ represents design observer gain.

Since the above equations (6), (8) to (11) are all conditions that are satisfied when considering a suitably long period of time, feedback of the measured quantity of the observer, equations (17) to (21) below are the equations (6), (8) to (11) in which values obtained by low pass filter processing with the low pass filter 16 are used on both sides.

$$\dot{\tilde{U}}_{0f} = -\frac{\tilde{U}_{0f}}{\tau_U} + \frac{\tilde{U}}{\tau_U} \quad (17)$$

$$\dot{\tilde{g}}_{xdf} = -\frac{\tilde{g}_{xdf}}{\tau_x} + \frac{g\sin\tilde{\theta}}{\tau_x} \quad (18)$$

$$\dot{\tilde{g}}_{ydf} = -\frac{\tilde{g}_{ydf}}{\tau_y} - \frac{g\cos\tilde{\theta}\sin\tilde{\phi}}{\tau_y} \quad (19)$$

$$\dot{\tilde{g}}_f = -\frac{\tilde{g}_f}{\tau_g} + \frac{-G_x\sin\tilde{\theta} + G_y\sin\tilde{\phi}\cos\tilde{\theta} + G_z\cos\tilde{\phi}\cos\tilde{\theta}}{\tau_g} \quad (20)$$

$$\dot{\tilde{W}}_{0f} = -\frac{\tilde{W}_{0f}}{\tau_W} + \frac{-\tilde{U}\sin\tilde{\theta} + \tilde{V}\sin\tilde{\phi}\cos\tilde{\theta} + \tilde{W}\cos\tilde{\phi}\cos\tilde{\theta}}{\tau_W} \quad (21)$$

wherein, $\tau_U$, $\tau_x$, $\tau_y$, $\tau_g$, $\tau_V$ respectively represent time constants of several seconds to several tens of seconds or more for low pass filtering of equations (6), (8), (9), (10), (11).

Next, the observer of roll angle φ and pitch angle θ of the present embodiment, estimating the roll angle φ and pitch angle θ using the above basic non-linear observer, will be explained. For the state equations relating to angle in the above equations (4) and (5), since there are no velocity state values included, the roll angle φ and the pitch angle θ may be independently estimated.

In order to do this, first, an observer is configured for estimating the roll angle and pitch angle including state values generated by the above low pass filter. In the present embodiment the observer, by setting an appropriate observer gain $k(\tilde{x}, u)$, estimates the roll angle and the pitch angle, with the state values of the observer as shown by the equation (22) below, the observer output for use in feedback as shown by the equation (23) below, and, further, the vehicle output computed from the sensor signal and the like, is shown by the equation (24) below.

$$\tilde{x} = [\tilde{\phi}\tilde{\theta}\tilde{g}_{xdf}\tilde{g}_{ydf}\tilde{g}_f]^T \quad (22)$$

$$\tilde{y} = [\tilde{g}_{xdf}\tilde{g}_{ydf}\tilde{g}_f]^T \quad (23)$$

$$y = [g_{xdf}g_{ydf}g]^T \quad (24)$$

Wherein, the following apply.

$$\dot{g}_{xdf} = -\frac{g_{xdf}}{\tau_x} + \frac{\dot{V}_{s0} - G_x}{\tau_x} \quad (25)$$

$$\dot{g}_{ydf} = -\frac{g_{ydf}}{\tau_y} + \frac{RV_{s0} - G_y}{\tau_y} \quad (26)$$

Here, the numerator of the second term on the right hand side in equation (25) is the longitudinal acceleration state value deviation that is the value of the derivative of the estimated value of the longitudinal vehicle body velocity $V_{s0}$ minus the longitudinal acceleration Gx detected by the triaxial sensor, and the second element on the right in equation (26) is the lateral acceleration state value deviation that is the product of the yaw angular velocity R with the estimated value of the longitudinal vehicle body velocity $V_{s0}$, minus the lateral acceleration Gy detected by the triaxial sensor.

In the present embodiment, an example of the observer gain is as shown by the equation (27) below, wherein in order to assure the stability of the observer, when carrying out linearization diagonal components have a negative coefficient.

$$k(\tilde{x}, u) = \begin{bmatrix} 0 & -K_{\phi y} & K_{\phi g}G_y \\ K_{\theta x} & 0 & -K_{\theta g}G_x \\ K_x & 0 & 0 \\ 0 & K_y & 0 \\ 0 & 0 & K_g \end{bmatrix} \quad (27)$$

Wherein, in the above, $K_{\phi y}$, $K_{\phi g}$, $K_{\theta x}$, $K_{\theta g}$, $K_x$, $K_y$, $K_g$ are appropriate positive constants. Therefore, the non-linear observer of the present embodiment estimating the roll angle and the pitch angle may be expressed by the motion equation below.

$$\frac{d}{dt}\tilde{x} = \begin{bmatrix} P + Q\sin\tilde{\phi}\tan\tilde{\theta} + R\cos\tilde{\phi}\tan\tilde{\theta}Q\cos\tilde{\phi} - R\sin\tilde{\phi} - \\ \frac{\tilde{g}_{xdf}}{\tau_x} + \frac{g\sin\tilde{\theta}}{\tau_x} - \frac{\tilde{g}_{ydf}}{\tau_y} - \frac{g\cos\tilde{\theta}\sin\tilde{\phi}}{\tau_y} - \\ \frac{\tilde{g}_f}{\tau_g} + \frac{-G_x\sin\tilde{\theta} + G_y\sin\tilde{\phi}\cos\tilde{\theta} + G_z\cos\tilde{\phi}\cos\tilde{\theta}}{\tau_g} \end{bmatrix} + \qquad (28)$$

$$\begin{bmatrix} 0 & -K_{\phi y} & K_{\phi g}G_y \\ K_{\theta x} & 0 & -K_{\theta g}G_x \\ K_x & 0 & 0 \\ 0 & K_y & 0 \\ 0 & 0 & K_g \end{bmatrix} \cdot \begin{bmatrix} g_{xdf} - \tilde{g}_{xdf} \\ g_{ydf} - \tilde{g}_{ydf} \\ g - \tilde{g}_f \end{bmatrix}$$

Wherein, the following applies.

$$\tilde{x} = [\tilde{\phi}\,\tilde{\theta}\,\tilde{g}_{xdf}\,\tilde{g}_{ydf}\,\tilde{g}_f]^T \qquad (22)$$

By using the above observer the roll angle and the pitch angle, which are attitude angles relative to a vertical direction of the vehicle, may be estimated.

Figure 4:
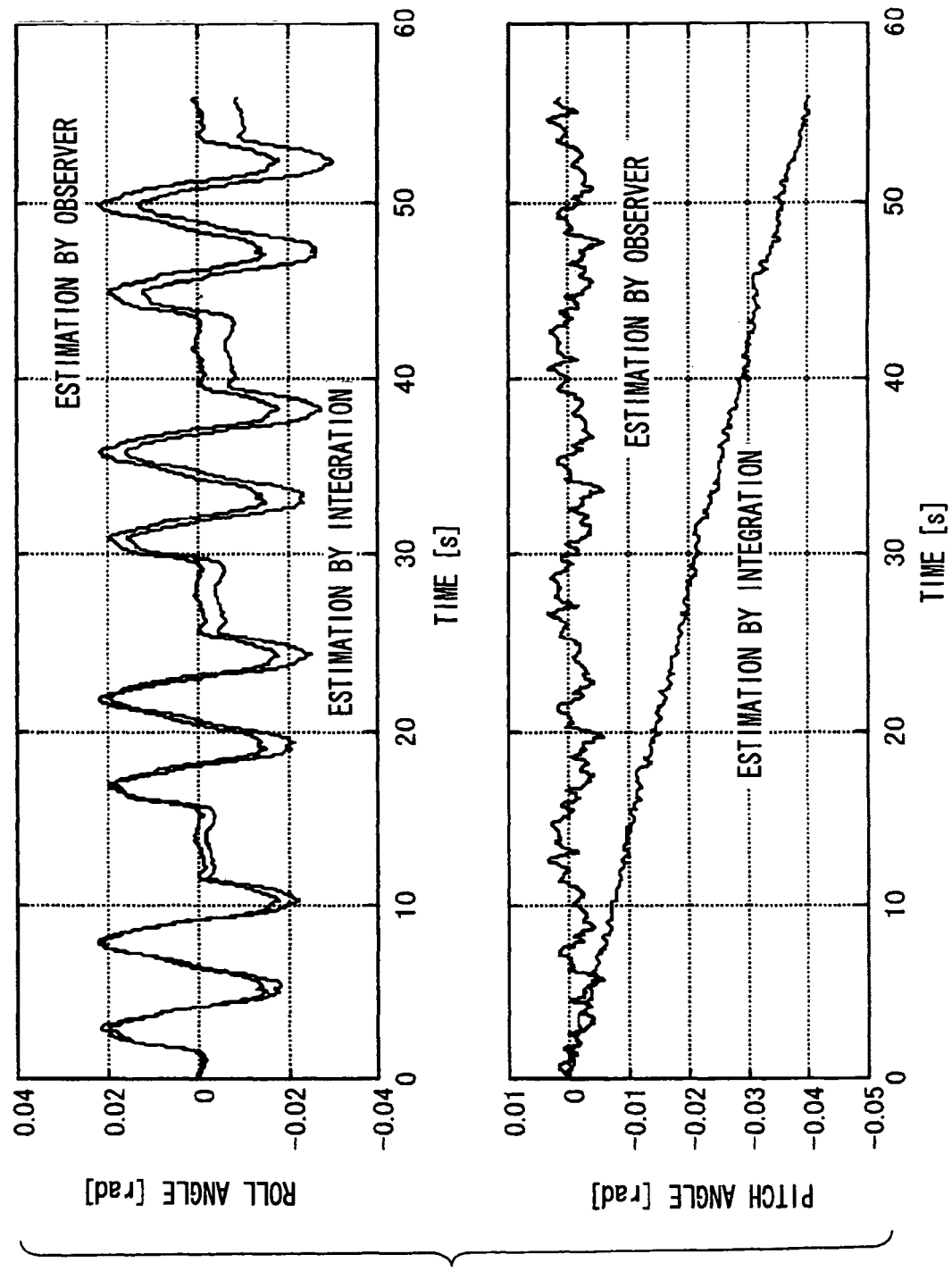
FIG. 4 is a diagram showing results of estimated roll angle and pitch angle of the first embodiment.

In FIG. 4, the estimation results of the roll angle φ and the pitch angle θ are shown with $K_{\phi y}$=0.5, $K_{\phi g}$=0.2, $K_{\theta x}$=0.5, $K_{\theta g}$=0.2, $K_x$=1.0, $K_y$=1.0, $K_g$=1.0, $\tau_x$=10 [S], $\tau_y$=20 [s], and $\tau_g$=10 [s]. Here, test conditions are a single lane change at 100 km/h, and in order to verify the presence or absence of divergence in the estimation results a comparison is carried out of the data four times with the simple integration results of equation (4) and equation (5). Whereas the integration results show a tendency to diverge, with the roll angle and the pitch angle being affected by integration errors, the estimation results by the observer show no divergence, due to the effect of the constraint conditions of equations (8), (9) and (10), and substantially constant results are output again and again, even with the passage of time.

As explained above, by the present embodiment, the conventional problem does not occur of error generation in the estimated values of pitch angle in accelerations/decelerations accompanied by tire slip, since the attitude angles are estimated based on the observer, from the relationship between the longitudinal and lateral components of vehicle motion in the relatively low frequency band region that is not influenced by spin or tire slip, and influence on the attitude angles relative to a vertical axis of the vehicle. Also, in the relatively low frequency band region that is not influenced by spin or tire slip, estimation based on integration of the acceleration and angular velocity becomes dominant, and high precision attitude angle estimations are realizable.

Also, in the present embodiment, cant of the road surface is estimated with high precision and high response as the vehicle body roll angle relative to a vertical axis, and the vehicle body velocity is estimated using this estimated value, therefore estimation may be made that is robust to vehicle body slip angle and the influence of road cant.

Figure 5:
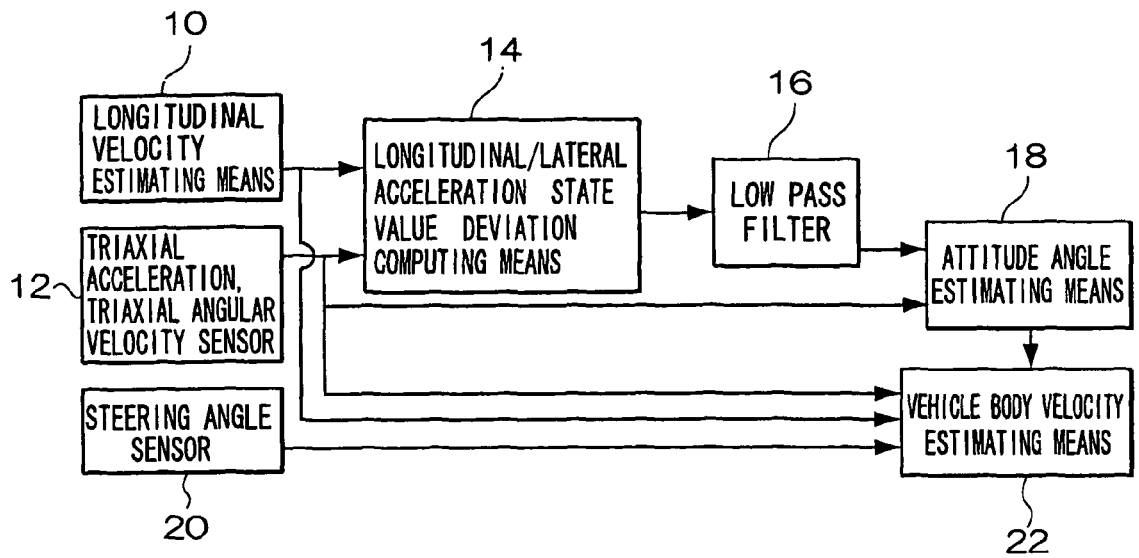
FIG. 5 is a block diagram showing a second embodiment of the invention.

Next, the second embodiment of the present invention will be explained. The present embodiment is configured, as shown in FIG. 5, of a vehicle body velocity estimating device of the attitude angle estimating device of FIG. 1 provided with a vehicle body velocity estimating unit 24. The vehicle body velocity estimating unit 24 estimates a new vehicle body velocity in the longitudinal direction and the lateral direction based on: the attitude angles of the pitch angle and roll angle estimated by the attitude angle estimating unit 18; the triaxial accelerations and triaxial velocities of the vehicle motion detected by the triaxial sensor 12; the estimated values of the vehicle body velocity in the vehicle longitudinal direction estimated by the longitudinal vehicle body velocity estimating unit 10; and the actual front wheel steering angle that is the steering angle detected by a steering angle sensor 26 for detecting the steering angle.

The vehicle body velocity observer estimating vehicle body velocity in the present embodiment will now be explained. Constraint conditions relating to velocity are shown in the above equations (6) and (10), but is it difficult to stabilize the observer using these two conditions alone. Therefore, the constraint condition as shown below in equation (29) is used, which uses a linear model of the vehicle motion, and equates the computed value of the model for the lateral velocity to the measured value.

$$G_y - g\cos\theta\sin\phi = -\frac{c_f + c_r}{mU}V - \frac{c_f l_f - c_r l_r}{mU}R + \frac{c_f}{m}\delta_f \qquad (29)$$

In the above, m is the vehicle mass, $c_f$ and $c_r$ are the front and rear wheel cornering powers, $l_f$ and $l_r$ are the distances of the front and rear axels from the center of mass, and $\delta_f$ is the actual steering angle of the front wheels. Here, the above equation (29) only holds in the margins of the linear regions of the tire characteristics, and therefore it is necessary to reduce the influence of the model at the boundary regions, reducing the feedback gain according to the absolute value of the deviation of the output, as shown in equation (30) below.

$$y_V - \tilde{y}_V = G_y - g\cos\tilde{\theta}\sin\tilde{\phi} + \frac{c_f + c_r}{m\tilde{U}}\tilde{V} + \frac{c_f l_f - c_r l_r}{m\tilde{U}}R - \frac{c_f}{m}\delta_f \qquad (30)$$

In the present embodiment the observer is configured for estimating the vehicle body velocity by setting state values of the observer as shown in equation (31) below, observer output using feedback as shown in equation (32) below, and vehicle output computed from sensor signals and the like as shown in equation (33) below, and further using appropriate observer gain k(x̃, u).

$$\tilde{x} = [\tilde{U}\,\tilde{V}\,\tilde{W}\,\tilde{U}_{0f}\,\tilde{W}_{0f}]^T \qquad (31)$$

$$\tilde{y} = [\tilde{U}_{0f}\,\tilde{y}_V\,\tilde{r}\,\tilde{W}_{0f}]^T \qquad (32)$$

$$\tilde{y} = [U_{0f}\,y_V\,0]^T \qquad (33)$$

Wherein, the following applies.

$$\dot{U}_{0f} = -\frac{U_{0f}}{\tau_U} - \frac{V_{s0}}{\tau_U} \qquad (34)$$

An example of the observer gain is as shown by the equation (35) below, such that, in order to assure the stability of the observer, when carrying out linearization opposite angular components have a negative coefficient.

$$k(\tilde{x}, u) = \begin{bmatrix} K_U & 0 & 0 \\ 0 & -K_V(y_V - \tilde{y}_V) & 0 \\ 0 & 0 & K_W \\ K_{U0} & 0 & 0 \\ 0 & 0 & K_{W0} \end{bmatrix} \quad (35)$$

Figure 6:
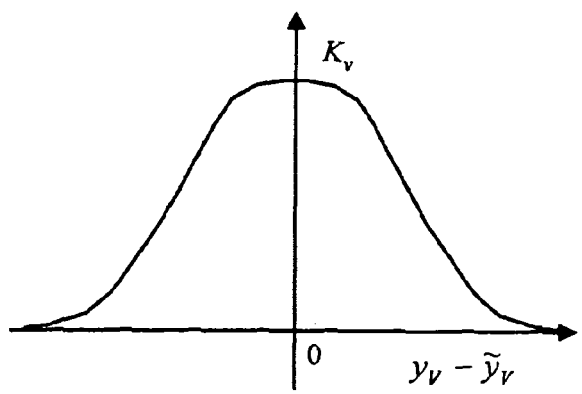
FIG. 6 is a graph showing the change in one constant for determining observer gain against deviation in output.

Wherein, in the above, $K_U$, $K_W$, $K_{U0}$, and $K_{W0}$ are appropriate positive constants. Also, $K_v$ is the non-linear function $y_v$-$\tilde{y}_v$ as shown in FIG. 6.

Therefore, the non-linear observer estimating the vehicle body velocity may be expressed as per the motion equation of equation (36) below using: the estimated attitude angles of pitch angle θ and roll angle ϕ estimated by the attitude angle estimating unit; the triaxial accelerations and triaxial angular velocities detected by the triaxial sensor; the estimated value of the vehicle body velocity in the vehicle forward-reverse direction estimated by the longitudinal vehicle body velocity estimating unit; and the steering angle.

$$\frac{d}{dt}\tilde{x} = \begin{bmatrix} -Q\tilde{W} + R\tilde{V} + g\sin\tilde{\theta} + G_x - R\tilde{U} + P\tilde{W} - \\ g\cos\tilde{\theta}\sin\tilde{\phi} + G_y - P\tilde{V} + Q\tilde{U} - \\ g\cos\tilde{\theta}\cos\tilde{\phi} + G_z - \frac{\tilde{U}_{0f}}{\tau_U} + \frac{\sqrt{\tilde{U}^2 + \tilde{V}^2 + \tilde{W}^2}}{\tau_U} - \\ \frac{\tilde{W}_{0f}}{\tau_W} + \frac{-\tilde{U}\sin\tilde{\theta} + \tilde{V}\sin\tilde{\phi}\cos\tilde{\theta} + \tilde{W}\cos\tilde{\phi}\cos\tilde{\theta}}{\tau_W} \end{bmatrix} + \quad (36)$$

$$\begin{bmatrix} K_U & 0 & 0 \\ 0 & -K_V(y_V - \tilde{y}_V) & 0 \\ 0 & 0 & K_W \\ K_{U0} & 0 & 0 \\ 0 & 0 & K_{W0} \end{bmatrix} \cdot \begin{bmatrix} U_{0f} - \tilde{U}_{0f} \\ y_V - \tilde{y}_V \\ -\tilde{W}_{0f} \end{bmatrix}$$

Wherein, the deviation in output and state values of the observer, as shown in the above equations (30) and (31), are expressed as below.

$$y_V - \tilde{y}_V = G_y - g\cos\tilde{\theta}\sin\tilde{\phi} + \frac{c_f + c_r}{m\tilde{U}}\tilde{V} + \frac{c_f l_f - c_r l_r}{m\tilde{U}}R - \frac{c_f}{m}\delta_f$$

$$\tilde{x} = [\tilde{U} \quad \tilde{V} \quad \tilde{W} \quad \tilde{U}_{0f} \quad \tilde{W}_{0f}]^T$$

Wherein, $\tilde{U}$ output from the calculations is a new estimated value of the vehicle body velocity in the longitudinal direction of the vehicle (vehicle body longitudinal velocity estimated value), and $\tilde{V}$ is the estimated value of the vehicle body velocity in the vehicle lateral direction (vehicle body lateral velocity estimated value).

In the present embodiment, since the vehicle body longitudinal velocity estimated value and the vehicle body lateral velocity estimated value are derived, the vehicle body slip angle β and slip velocity s may be computed as below in the vehicle body velocity estimating unit 24.

The vehicle body slip angle β may be derived by equation (37) below using the state value, estimated as above, in the observer.

$$\tilde{\beta} = \tan^{-1}\left(\frac{\tilde{V}}{\tilde{U}}\right) \quad (37)$$

Also, the slip of each of the wheels in the longitudinal direction, that is the slip speed s, may be computed as per the following equation (38).

$$s = \tilde{U} - r_t \omega \quad (38)$$

Wherein, in the above $r_t$ is the radius of each of the tires, and ω is the rotational angular velocity of each of the wheels.

Figure 7:
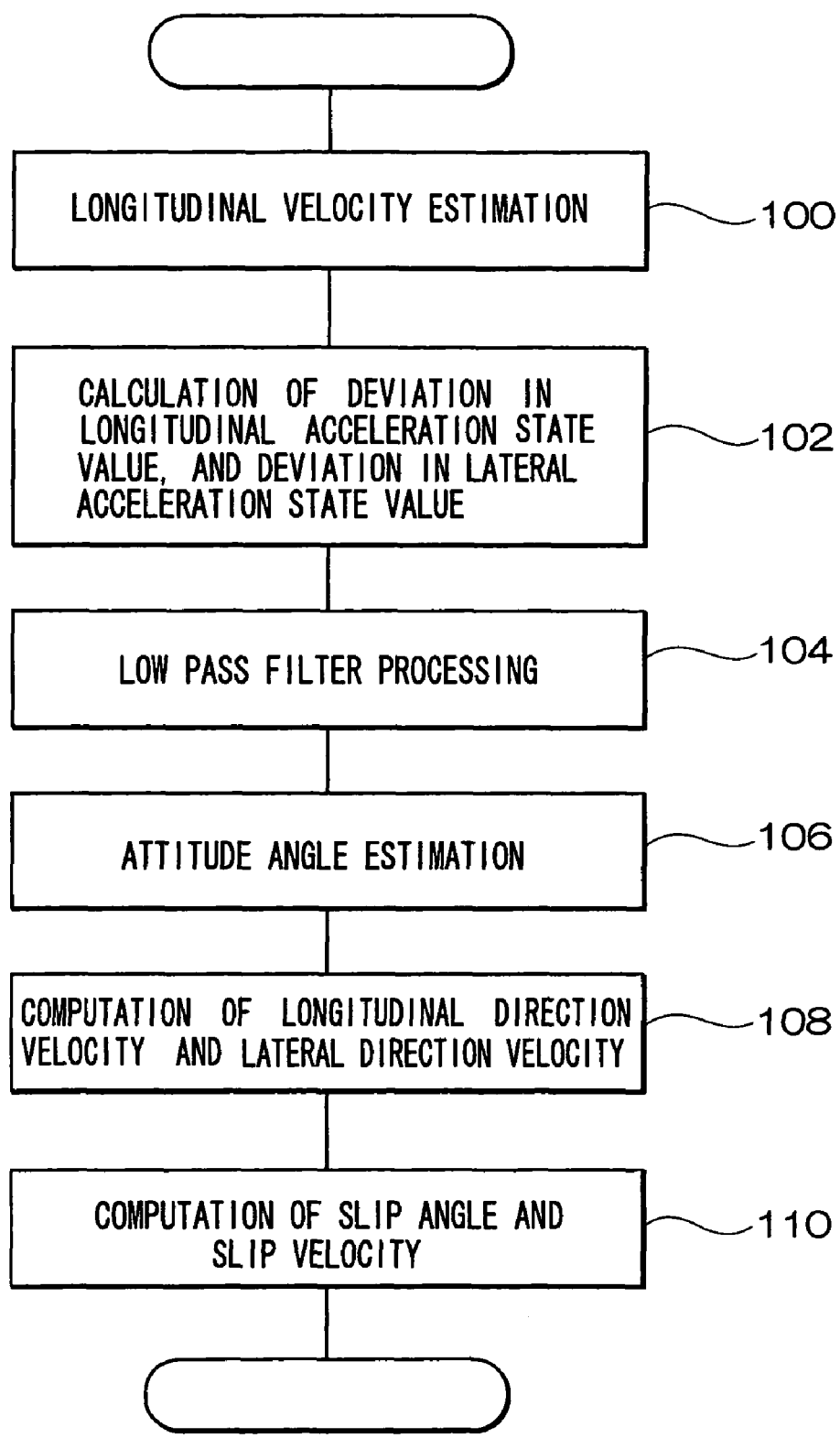
FIG. 7 is a flow diagram showing processing in the second embodiment of the present invention.

In the above second embodiment a computer(s) configures and realizes the functions of: the longitudinal velocity estimating unit 10; the longitudinal/lateral acceleration state value deviation computing unit 14; the low pass filter 16; the attitude angle estimating unit 18; and the vehicle body velocity estimating unit 24. Also, such that the slip angle and the slip speed are computed, information processing is carried out by program(s) used in the computer(s) as per the sequence shown in FIG. 7. In the sequence step 100 estimates the longitudinal vehicle body velocity based on the wheel velocities of each of the wheels as explained above. At step 102, as explained above, computing is made of the deviation in the longitudinal acceleration state value and the deviation in the lateral acceleration state value, based on the estimated value of the longitudinal vehicle body velocity and the detected triaxial accelerations and triaxial angular velocities. At step 104 processing by low pass filtering is carried out, and, as explained above, relatively low frequency components of the deviations of the longitudinal acceleration state value and the deviations in the lateral acceleration state value are allowed to pass. In step 106, estimation is made of the attitude angles of the roll angle and the pitch angle, based on the post low pass filtering deviations of the longitudinal acceleration state value and the post low pass filtering deviations in the lateral acceleration state value, and on the detected triaxial accelerations and triaxial angular velocities. At step 108, computing is made of a new vehicle body velocity in the vehicle longitudinal direction and the vehicle body lateral velocity, based on the estimated value of the attitude angle, estimated as explained above, the detected triaxial accelerations and triaxial angular velocities, and the detected steering angle. At step 110 computing of the slip angle and the slip velocity is carried out, as per the above explanation, using the computed new vehicle body velocity in the longitudinal direction and the vehicle body lateral velocity.

Here, in the present embodiment, whichever of vehicle body slip angle β and slip velocity s may be estimated.

Next, a third embodiment of the present invention will be explained. The third embodiment is an embodiment that presumes normal vehicle motion, and recognizing that the pitch angle of the attitude angle is relatively smaller in magnitude than the roll angle, the pitch angle θ is presumed to be 0, and the roll angle ϕ is estimated.

In the present embodiment the roll angle ϕ may be estimated without detecting the pitch angular velocity Q. Since the detected values of the behavior of the vehicle motion that are detected in the present embodiment are longitudinal acceleration Gx, lateral acceleration Gy, vertical acceleration Gz, roll angular velocity P, and yaw angular velocity R, sensor 12 is substituted, and a sensor is used for detecting triaxial accelerations and biaxial angular velocities of roll angular velocity P and yaw angular velocity R. Further, the observer is configured as below. Other parts of the configuration are the same as those of FIG. 1, and explanation thereof will be omitted.

Specifically, when the pitch angular velocity Q and the estimated value of the pitch angle are set to a constant value of 0 in the above (28), by carrying out the computing using the observer as expressed in the following equation (39), the roll angle $\phi$ is estimated presuming that the pitch angle $\theta$ is 0.

$$\frac{d}{dt}\tilde{x} = \begin{bmatrix} P - \\ R\sin\tilde{\phi} - \\ \dfrac{\tilde{g}_{xdf}}{\tau_x} - \\ \dfrac{\tilde{g}_{ydf}}{\tau_y} - \dfrac{g\sin\tilde{\phi}}{\tau_y} - \\ \dfrac{\tilde{g}_f}{\tau_g} + \dfrac{G_y\sin\tilde{\phi} + G_z\cos\tilde{\phi}}{\tau_g} \end{bmatrix} + \begin{bmatrix} 0 & -K_{\phi y} & K_{\phi g}G_y \\ K_{\theta x} & 0 & -K_{\theta g}G_x \\ K_x & 0 & 0 \\ 0 & K_y & 0 \\ 0 & 0 & K_g \end{bmatrix} \cdot \begin{bmatrix} g_{xdf} - \tilde{g}_{xdf} \\ g_{ydf} - \tilde{g}_{ydf} \\ g - \tilde{g}_f \end{bmatrix} \quad (39)$$

Here, $g_{xdf}$, $g_{ydf}$ are contained in equation (39) and so for these, the longitudinal acceleration state value deviation that is the differential of the estimated value of the longitudinal vehicle body velocity $V_{s0}$ minus the longitudinal acceleration value Gx detected by the triaxial sensor; and the lateral acceleration state value deviation that is the product of the yaw angular velocity R detected by the triaxial sensor with the longitudinal vehicle body velocity $V_{s0}$, from which the lateral acceleration Gy detected by the triaxial sensor is subtracted, are used.

In the present embodiment too, based on the actual front wheel steering angle that is the steering angle detected by the steering angle sensor 26 for detecting steering angle, by configuring as shown in FIG. 5, with the vehicle body velocity estimating unit 24 provided estimating the new vehicle body velocity in the longitudinal direction and the vehicle body velocity in the lateral direction, the new vehicle body velocity in the longitudinal direction and the vehicle body velocity in the lateral direction may be estimated together with computing the vehicle body slip angle $\beta$ and slip velocity s as described above.

Figure 8:
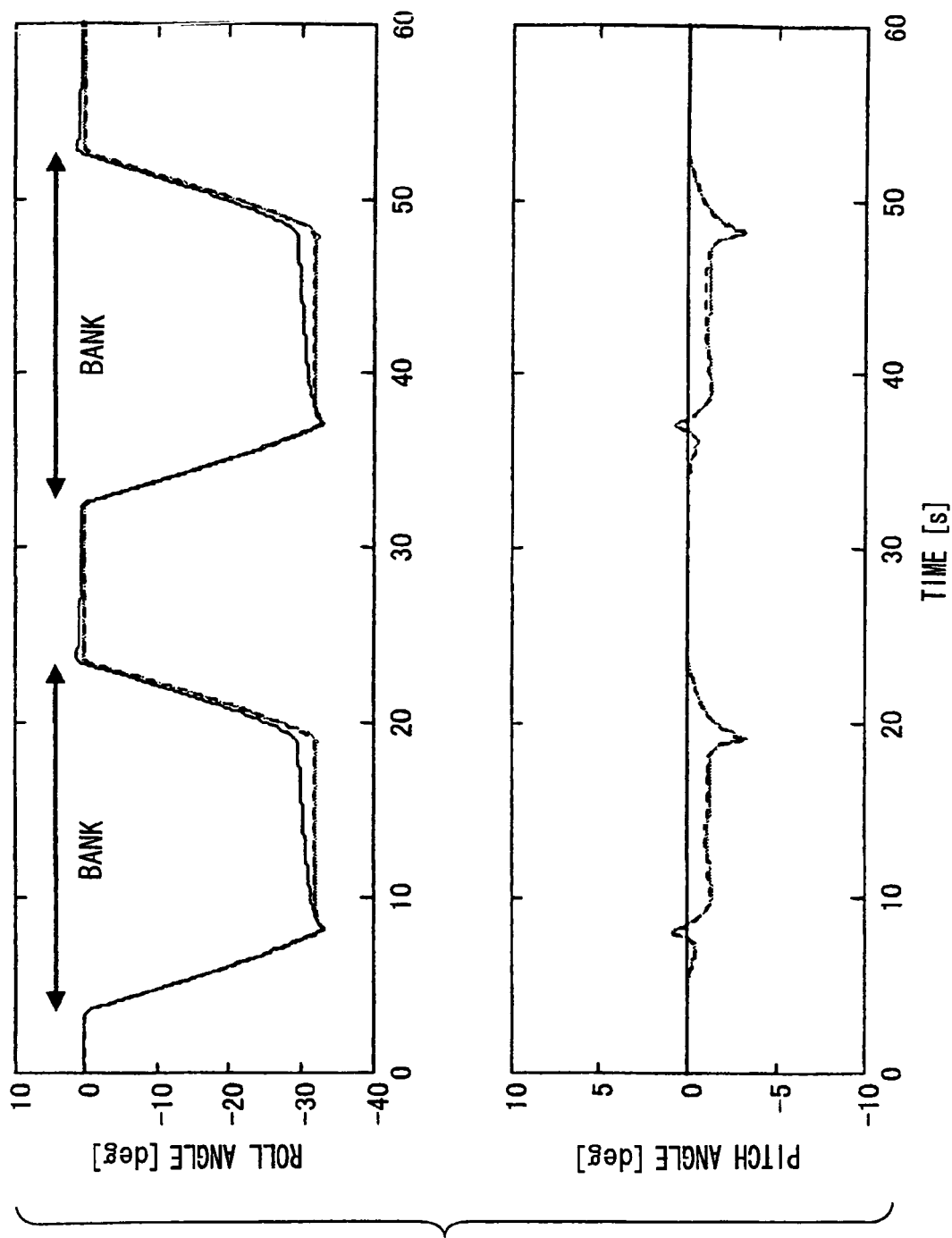
FIG. 8 is a diagram showing results of estimated roll angle of a third embodiment.

In FIG. 8 is shown the results of carrying out computed estimations of the roll angle from the results of a simulation of road surface running, including a bank, at a velocity of 40 km/h. In the simulation computing the true value of the roll angle calculated is shown as an intermittent line superimposed on a gray line, the roll angle estimated using the signal from the triaxial angular velocity and triaxial acceleration containing the pitch angular velocity is shown by an intermittent line, and the roll angle estimated on the basis of the signal excluding the pitch angular velocity is shown by the solid line.

Here, in the case of estimation on the basis of the signal excluding the pitch angular velocity, since the pitch angle is presumed to be 0, the pitch angle of the chart is also 0. From this chart it may be seen that when running on a bank, even without using an estimate of the pitch angle, the roll angle may be estimated to within ±5 degrees.

Next, explanation of a fourth embodiment of the present invention will be given. In the present embodiment the influence of spin on the vehicle motion is limited to a relatively high frequency region, that is to say, it is not a phenomenon that continues for a long period of time, and further, as explained above, when assuming normal vehicle motion, and recognizing that the pitch angle of the attitude angle is relatively smaller in magnitude to that of the roll angle, the vertical acceleration Gz and the pitch angle $\theta$ are presumed in the present embodiment to be 0, and the roll angle $\phi$ is estimated. Since the detected values of the behavior of the vehicle motion that are detected in the present embodiment are each of the biaxial accelerations that are the lateral acceleration Gy, biaxial angular velocities that are the roll angular velocity P and the yaw angular velocity R, a sensor detecting biaxial accelerations and biaxial angular velocities is used instead of the sensor 12. Further, the observer is configured as below, a lateral acceleration state deviation computing unit is provided for computing the lateral acceleration state deviation as expressed by the numerator of the second term on the right side of equation (43) below, instead of the longitudinal/lateral acceleration state deviation computing unit 14. Other parts of the configuration are the same as those of FIG. 1, and explanation thereof will be omitted.

In the present embodiment the observer estimating the roll angle will be explained. In the present embodiment the state value of the observer is shown as per the following equation (40), the observer output using feedback is shown as per the following equation (41) and the vehicle output computed from the sensor signal is shown as per the following equation (42).

$$\tilde{X} = [\tilde{\phi}\,\tilde{g}_{ydf}]^T \quad (40)$$

$$\tilde{y} = \tilde{g}_{ydf} \quad (41)$$

$$y = g_{ydf} \quad (42)$$

Wherein the following applies.

$$\dot{\tilde{g}}_{ydf} = -\frac{g_{ydf}}{\tau_y} + \frac{RV_{x0} - G_y}{\tau_y} \quad (43)$$

Here, the non-linear observer estimating the roll angle is expressed as the following motion equation.

$$\frac{d}{dt}\tilde{x} = \begin{bmatrix} P \\ -\dfrac{\tilde{g}_{ydf}}{\tau_y} - \dfrac{g\sin\tilde{\phi}}{\tau_y} \end{bmatrix} + \begin{bmatrix} -K_{\phi y} \\ K_y \end{bmatrix} \cdot (g_{ydf} - \tilde{g}_{ydf}) \quad (44)$$

Wherein, in the above $K_{\phi y}$, $K_y$ are appropriate positive constants.

In the present embodiment too, based on the actual front wheel steering angle that is the steering angle detected by the steering angle sensor 26 for detecting steering angle, by configuring as shown in FIG. 5, with the vehicle body velocity estimating unit 24 provided estimating the new vehicle body velocity in the longitudinal direction and the vehicle body velocity in the lateral direction, the new vehicle body velocity in the longitudinal direction and the vehicle body velocity in the lateral direction may be estimated together with computing the vehicle body slip angle $\beta$ and slip velocity s as described above.

Particular embodiments of the present invention have been explained, but the present invention is not limited thereto, and it must be understood that various possible modifications that are within the spirit and scope of the present invention are included.

What is claimed is:

1. A vehicle physical quantity estimating device comprising:
   a longitudinal vehicle body velocity estimating unit, estimating, based on vehicle wheel velocities of each of the wheels, a longitudinal vehicle body velocity that is the vehicle body velocity in the forward-reverse direction of a vehicle;
   a longitudinal/lateral acceleration state value deviation computing unit, computing a deviation in a longitudinal acceleration state value and a deviation in a lateral acceleration state value that develop according to a vehicle attitude angle, based on
      sensor signal(s) corresponding to detected values of the vehicle motions of triaxial accelerations of a longitudinal acceleration, a lateral acceleration and a vertical acceleration and triaxial angular velocities of a roll angle velocity, a pitch angle velocity, and a yaw angular velocity, and based on
      the estimate of the longitudinal vehicle body velocity;
   a low pass filter, carrying out processing that lets only signals corresponding to motions that need attention pass through from signals that express the deviation in a longitudinal acceleration state value and the deviation in a lateral acceleration state value; and
   an attitude angle estimating unit, estimating the attitude angle as a vehicle physical quantity based on the sensor signal(s), a signal representing the deviation in a longitudinal acceleration state value after low pass filter processing, and a signal representing the deviation in a lateral acceleration state value after low pass filter processing.

2. The vehicle physical quantity estimating device of claim 1, further comprising:
   a sensor, detecting the vehicle motions of triaxial accelerations of a longitudinal acceleration, a lateral acceleration and a vertical acceleration and triaxial angular velocities of a roll angle velocity, a pitch angle velocity, and a yaw angular velocity, and outputting the sensor signal corresponding to the detected values.

3. The vehicle physical quantity estimating device of claim 1, further comprising
   a vehicle body velocity estimating unit, estimating vehicle physical quantities of a new vehicle body velocity in the vehicle longitudinal direction and a vehicle velocity in the lateral direction, based on:
   the estimated value of attitude angle, estimated by the attitude angle estimating unit;
   the vehicle motions of triaxial acceleration and triaxial angular velocity;
   the estimated value of the longitudinal vehicle body velocity, estimated by the longitudinal velocity estimating unit; and
   a steering angle.

4. The vehicle physical quantity estimating device of claim 2, further comprising
   a vehicle body velocity estimating unit, estimating vehicle physical quantities of a new vehicle body velocity in the vehicle longitudinal direction and a vehicle velocity in the lateral direction, based on:
   the estimated value of attitude angle, estimated by the attitude angle estimating unit;
   the vehicle motions of triaxial acceleration and triaxial angular velocity;
   the estimated value of the longitudinal vehicle body velocity, estimated by the longitudinal velocity estimating unit; and
   a steering angle.

5. The vehicle physical quantity estimating device of claim 1, wherein:
   the deviation in the longitudinal acceleration state value is a value that is the differential of the estimated value of the longitudinal velocity from which the longitudinal acceleration is subtracted, and
   the deviation in the lateral acceleration state value is a value that is the product of the yaw angular velocity value with the estimated value of the longitudinal velocity, from which the lateral acceleration is subtracted.

6. The vehicle physical quantity estimating device of claim 2, wherein:
   the deviation in the longitudinal acceleration state value is a value that is the differential of the estimated value of the longitudinal velocity from which the longitudinal acceleration is subtracted, and
   the deviation in the lateral acceleration state value is a value that is the product of the yaw angular velocity value with the estimated value of the longitudinal velocity, from which the lateral acceleration is subtracted.

7. The vehicle physical quantity estimating device of claim 3, wherein:
   the deviation in the longitudinal acceleration state value is a value that is the differential of the estimated value of the longitudinal velocity from which the longitudinal acceleration is subtracted, and
   the deviation in the lateral acceleration state value is a value that is the product of the yaw angular velocity value with the estimated value of the longitudinal velocity, from which the lateral acceleration is subtracted.

8. The vehicle physical quantity estimating device of claim 3, wherein the vehicle body velocity estimating unit estimates as vehicle physical quantities at least one of the slip angle and/or the slip velocity, using the estimated value of the new vehicle body velocity in the vehicle longitudinal direction and the estimated value of the vehicle velocity in the lateral direction.

9. The vehicle physical quantity estimating device of claim 5, wherein the vehicle body velocity estimating unit estimates at least one of the slip angle and/or the slip velocity, using the estimated value of the new vehicle body velocity in the vehicle longitudinal direction and the estimated value of the vehicle velocity in the lateral direction.

10. A memory medium on which a computer program is stored, the computer program causing a computer to perform functions comprising those of:
   a longitudinal vehicle body velocity estimating unit, estimating, based on vehicle wheel velocities of each of the wheels, a longitudinal vehicle body velocity that is the vehicle body velocity in the forward-reverse direction of a vehicle;
   a longitudinal/lateral acceleration state value deviation computing unit, computing a deviation in a longitudinal acceleration state value and a deviation in a lateral acceleration state value that develop according to the vehicle attitude angle, based on
      sensor signal(s) corresponding to detected values of the vehicle motions of triaxial accelerations of a longitudinal acceleration, a lateral acceleration and a vertical acceleration and triaxial angular velocities of a roll angle velocity, a pitch angle velocity, and a yaw angular velocity, and based on
      the estimate of the longitudinal vehicle body velocity;

a low pass filter, carrying out processing that lets only signals corresponding to motions that need attention pass through from signals that express the deviation in a longitudinal acceleration state value and the deviation in a lateral acceleration state value; and an attitude angle estimating unit, estimating as a vehicle physical quantity the attitude angle based on the sensor signal(s), a signal representing the deviation in a longitudinal acceleration state value after low pass filter processing, and a signal representing the deviation in a lateral acceleration state value after low pass filter processing.

11. The memory medium of claim 10, the functions further comprising those of:

a vehicle body velocity estimating unit, estimating vehicle physical quantities of a new vehicle body velocity in the vehicle longitudinal direction and a vehicle velocity in the lateral direction, based on:

the estimated value of attitude angle, estimated by the attitude angle estimating unit;

the vehicle motions of triaxial acceleration and triaxial angular velocity;

the estimated value of the longitudinal vehicle body velocity, estimated by the longitudinal velocity estimating unit; and a steering angle.

12. A vehicle physical quantity estimating device comprising:

a longitudinal vehicle body velocity estimating unit, estimating, based on vehicle wheel velocities of each of the wheels, a longitudinal vehicle body velocity that is the vehicle body velocity in the forward-reverse direction of a vehicle;

a lateral acceleration deviation computing unit, computing a deviation in a lateral acceleration state value that develops according to a vehicle attitude angle, based on sensor signal(s) corresponding to detected value(s) of vehicle motion behavior, and the estimate of the longitudinal vehicle body velocity;

a low pass filter, carrying out processing that lets only signals corresponding to motions that need attention pass through from signals that express the deviation in a lateral acceleration state value; and an attitude angle estimating unit, estimating the attitude angle as a vehicle physical quantity based on the sensor signal(s), and a signal representing the deviation in a lateral acceleration state value after low pass filter processing.

13. The vehicle physical quantity estimating device of claim 12 wherein the vehicle body velocity estimating unit estimates as vehicle physical quantities at least one of the slip angle and/or the slip velocity, using the estimated value of the new vehicle body velocity in the vehicle longitudinal direction and the estimated value of the vehicle velocity in the lateral direction.

14. A vehicle physical quantity estimating device comprising:

a longitudinal vehicle body velocity estimating unit, estimating, based on vehicle wheel velocities of each of the wheels, a longitudinal vehicle body velocity that is the vehicle body velocity in the forward-reverse direction of a vehicle;

a longitudinal/lateral acceleration deviation computing unit, computing a deviation in a longitudinal acceleration state value and a deviation in a lateral acceleration state value that develop according to a vehicle attitude angle, based on sensor signal(s) corresponding to detected values of vehicle motion behavior and the estimate of the longitudinal vehicle body velocity;

a low pass filter, carrying out processing that lets only signals corresponding to motions that need attention pass through from signals that express the deviation in a longitudinal acceleration state value and the deviation in a lateral acceleration state value; and an attitude angle estimating unit, estimating as a vehicle physical quantity the attitude angle based on the sensor signal(s), a signal representing the deviation in a longitudinal acceleration state value after low pass filter processing, and a signal representing the deviation in a lateral acceleration state value after low pass filter processing.

15. The vehicle physical quantity estimating device of claim 14 wherein detected values of the vehicle motion behavior are detected values of each of longitudinal acceleration, lateral acceleration, vertical acceleration, roll angular velocity, and yaw angular velocity, and the deviation in the lateral acceleration state value is a value that is the product of the detected yaw angular velocity value with the estimated value of the longitudinal velocity, from which the detected value of the lateral acceleration is subtracted.

16. The vehicle physical quantity estimating device of claim 14 wherein detected values of the vehicle motion behavior are detected values of each of lateral acceleration, roll angular velocity, and yaw angular velocity, the deviation in the longitudinal acceleration state value is a value that is the differential of the estimated value of the longitudinal velocity from which the longitudinal acceleration is subtracted, and the deviation in the lateral acceleration state value is a value that is the product of the yaw angular velocity value with the estimated value of the longitudinal velocity, from which the lateral acceleration is subtracted.

17. The vehicle physical quantity estimating device of claim 12 further comprising:

a vehicle body velocity estimating unit, estimating vehicle physical quantities of a new vehicle body velocity in the vehicle longitudinal direction and a vehicle velocity in the lateral direction, based on:

the estimated value of attitude angle, estimated by the attitude angle estimating unit;

the detected values of the vehicle motion behavior;

the estimated value of the longitudinal vehicle body velocity, estimated by the longitudinal velocity estimating unit; and a steering angle.

18. The vehicle physical quantity estimating device of claim 13 further comprising:

a vehicle body velocity estimating unit, estimating vehicle physical quantities of a new vehicle body velocity in the vehicle longitudinal direction and a vehicle velocity in the lateral direction, based on:

the estimated value of attitude angle, estimated by the attitude angle estimating unit;

the detected values of vehicle motion behavior;

the estimated value of the longitudinal vehicle body velocity, estimated by the longitudinal velocity estimating unit; and a steering angle.

19. The vehicle physical quantity estimating device of claim 14 further comprising:

a vehicle body velocity estimating unit, estimating vehicle physical quantities of a new vehicle body velocity in the vehicle longitudinal direction and a vehicle velocity in the lateral direction, based on:

the estimated value of attitude angle, estimated by the attitude angle estimating unit;
the detected values of vehicle motion behavior;
longitudinal velocity estimating unit; and
a steering angle.

20. The vehicle physical quantity estimating device of claim 15 further comprising:
a vehicle body velocity estimating unit, estimating vehicle physical quantities of a new vehicle body velocity in the vehicle longitudinal direction and a vehicle velocity in the lateral direction, based on:
the estimated value of attitude angle, estimated by the attitude angle estimating unit;
the detected values of vehicle motion behavior;
the estimated value of the longitudinal vehicle body velocity, estimated by the longitudinal velocity estimating unit; and
a steering angle.

21. The vehicle physical quantity estimating device of claim 17 wherein the vehicle body velocity estimating unit estimates as vehicle physical quantities at least one of the slip angle and/or the slip velocity, using the estimated value of the new vehicle body velocity in the vehicle longitudinal direction and the estimated value of the vehicle velocity in the lateral direction.

22. The vehicle physical quantity estimating device of claim 16 further comprising:
a vehicle body velocity estimating unit, estimating vehicle physical quantities of a new vehicle body velocity in the vehicle longitudinal direction and a vehicle velocity in the lateral direction, based on:
the estimated value of attitude angle, estimated by the attitude angle estimating unit;
the detected values of vehicle motion behavior;
the estimated value of the longitudinal vehicle body velocity, estimated by the longitudinal velocity estimating unit; and
a steering angle.

23. A memory medium on which a computer program is stored, the computer program causing a computer to perform functions comprising those of:
a longitudinal vehicle body velocity estimating unit, estimating, based on vehicle wheel velocities of each of the wheels, a longitudinal vehicle body velocity that is the vehicle body velocity in the forward-reverse direction of a vehicle;
a lateral acceleration deviation computing unit, computing a deviation in a lateral acceleration state value that develops according to a vehicle attitude angle, based on sensor signal(s) corresponding to detected value(s) of vehicle motion behavior, and the estimate of the longitudinal vehicle body velocity;
a low pass filter, carrying out processing that lets only signals corresponding to motions that need attention pass through from signals that express the deviation in a lateral acceleration state value; and
an attitude angle estimating unit, estimating as a vehicle physical quantity the attitude angle based on the sensor signal(s), and a signal representing the deviation in a lateral acceleration state value after low pass filter processing.

24. A memory medium on which a computer program is stored, the computer program causing a computer to perform functions comprising those of:
a longitudinal vehicle body velocity estimating unit, estimating, based on vehicle wheel velocities of each of the wheels, a longitudinal vehicle body velocity that is the vehicle body velocity in the forward-reverse direction of a vehicle;
a longitudinal/lateral acceleration deviation computing unit, computing a deviation in a longitudinal acceleration state value and a deviation in a lateral acceleration state value that develop according to a vehicle attitude angle, based on sensor signal(s) corresponding to detected values of vehicle motion behavior and the estimate of the longitudinal vehicle body velocity;
a low pass filter, carrying out processing that lets only signals corresponding to motions that need attention pass through from signals that express the deviation in a longitudinal acceleration state value and the deviation in a lateral acceleration state value; and
an attitude angle estimating unit, estimating as a vehicle physical quantity the attitude angle based on the sensor signal(s), a signal representing the deviation in a longitudinal acceleration state value after low pass filter processing, and a signal representing the deviation in a lateral acceleration state value after low pass filter processing.

25. The vehicle physical quantity estimating device of claim 12 wherein the detected values of the vehicle motion behavior are detected values of each of lateral acceleration, roll angular velocity, and yaw angular velocity, and the deviation in the lateral acceleration state value is a value that is the product of the detected yaw angular velocity value with the estimated value of the longitudinal velocity, from which the detected value of the lateral acceleration is subtracted.

* * * * *